United States Patent
Diotte et al.

(10) Patent No.: US 10,320,282 B2
(45) Date of Patent: Jun. 11, 2019

(54) VOLTAGE REGULATOR VOLTAGE OVERSHOOT LOOK-BACK

(71) Applicants: Bertrand Diotte, San Diego, CA (US); Jason Rau, San Diego, CA (US); Hassan Ihs, San Diego, CA (US)

(72) Inventors: Bertrand Diotte, San Diego, CA (US); Jason Rau, San Diego, CA (US); Hassan Ihs, San Diego, CA (US)

(73) Assignee: Chaoyang Semiconductor Jiangyin Technology Co., Ltd., Jiangyin (CN)

(*) Notice: Subject to any disclaimer, the term of this patent is extended or adjusted under 35 U.S.C. 154(b) by 0 days.

(21) Appl. No.: 16/007,968

(22) Filed: Jun. 13, 2018

(65) Prior Publication Data

US 2018/0358891 A1    Dec. 13, 2018

Related U.S. Application Data

(60) Provisional application No. 62/519,036, filed on Jun. 13, 2017.

(51) Int. Cl.
| | |
|---|---|
| *H02M 3/157* | (2006.01) |
| *H02M 1/32* | (2007.01) |
| *H02M 1/08* | (2006.01) |
| *H02M 3/158* | (2006.01) |

(52) U.S. Cl.
CPC ............... *H02M 1/32* (2013.01); *H02M 1/08* (2013.01); *H02M 3/1584* (2013.01); *H02M 2001/325* (2013.01)

(58) Field of Classification Search
CPC ........... H02M 2001/0012; H02M 1/32; H02M 2001/325; H02M 3/156; H02M 3/157; H02M 3/1566; H02M 3/1584; H02M 3/1588

See application file for complete search history.

(56) References Cited

U.S. PATENT DOCUMENTS

| | | | |
|---|---|---|---|
| 5,029,269 A | 7/1991 | Elliott et al. | |
| 5,998,977 A * | 12/1999 | Hsu | H02M 1/36 323/272 |
| 6,509,721 B1 * | 1/2003 | Liebler | H02M 3/158 323/224 |
| 7,109,689 B2 * | 9/2006 | Schneider | H02M 3/1584 323/272 |

(Continued)

FOREIGN PATENT DOCUMENTS

| | | |
|---|---|---|
| CN | 103427624 A | 12/2013 |
| JP | 2009100602 A | 5/2009 |

OTHER PUBLICATIONS

International Search Report on related PCT Application No. PCT/US2018/037425 from International Searching Authority (KIPO) dated Sep. 28, 2018.

(Continued)

*Primary Examiner* — Gary L Laxton
(74) *Attorney, Agent, or Firm* — Klein, O'Neill & Singh, LLP

(57) ABSTRACT

A deglitch circuit, or look-back, may be used to reduce or avoid reacting to a transient overvoltage situation by a voltage regulator. The voltage regulator may delay reacting to an overvoltage situation unless the overvoltage situation persists for more than a first programmable number of cycles.

7 Claims, 15 Drawing Sheets

(56) References Cited

U.S. PATENT DOCUMENTS

| | | |
|---|---|---|
| 9,065,339 B2 * | 6/2015 | Pierson .................. H02M 1/32 |
| 9,673,710 B2 * | 6/2017 | Ihs ........................ H02M 3/158 |
| 9,859,793 B2 * | 1/2018 | Ihs ........................ H02M 3/158 |
| 2012/0081095 A1 | 4/2012 | Kung |
| 2015/0194882 A1 | 7/2015 | Ihs |

OTHER PUBLICATIONS

Written Opinion on related PCT Application No. PCT/US2018/037425 from International Searching Authority (KIPO) dated Sep. 28, 2018.

* cited by examiner

VOLTAGE REGULATOR VOLTAGE OVERSHOOT LOOK-BACK

CROSS REFERENCE TO RELATED APPLICATION

This application claims the benefit of the filing date of U.S. Provisional Patent Application No. 62/519,036, filed on Jun. 13, 2017, the disclosure of which is incorporated by reference herein.

BACKGROUND OF THE INVENTION

The present invention relates generally to power regulation for integrated circuits, and more particularly to voltage overshoot responses by power regulation circuitry.

Some battery-operated devices such as mobile phones, smart phones, and digital tablets may include powerful processors and other circuitry that may use large amounts of power. Generally, however, the device themselves are desired to be small and light, implying smaller, less powerful batteries. In order to conserve battery charge and increase battery life, circuits of such devices may be temporarily powered off or provided reduced power from time-to-time, depending on operational circumstances.

Unfortunately, those operational circumstances may rapidly change as the device is used. Power used by the device, or portions of the device, therefore may have large and rapid fluctuations. Moreover, integrated circuits generally require provision of power within particular parameters during operation. Further confusing matters, there may be circumstances in which supplied voltage levels may simply oscillate about various levels during normal device operation. All of this, and more, may increase difficulties in design and operation of voltage regulation circuitry responsible for stably and properly regulating power to the device.

BRIEF SUMMARY OF THE INVENTION

Some embodiments in accordance with aspects of the invention may provide a voltage regulator, comprising: at least one phase of a voltage regulator, each phase comprising a high side switch and a low side switch coupled in series between a higher voltage and a lower voltage, with an output inductor having a first end coupled to a node between the high side switch and the low side switch and a second end coupled to a load, with a bypass switch in parallel to the inductor; an overvoltage comparator for determining if voltage provided to a load is over an overvoltage threshold and providing an overvoltage indicator based on results of the determination; a deglitch circuit for providing a smoothed overvoltage indicator by removing transient indications from the overvoltage indicator that the voltage provided to the load is over the overvoltage threshold; and a controller configured to operate the high side switch, the low side switch, and the bypass switch of each phase based on the smoothed overvoltage indicator. In some embodiments the controller is configured to determine whether to operate the switches based on the smoothed overvoltage indicator or the overvoltage indicator.

Other embodiments in accordance with aspects of the invention provide a method useful in operating a multi-phase DC-DC switching voltage regulator, the multi-phase DC-DC switching voltage regulator having a plurality of parallel phases coupled to an output capacitor and a load in parallel, each phase including a high side switch and a low side switch coupled in series, with an inductor having a first end coupled to a node between the high side switch and the low side switch and a second end coupled to an output capacitor in parallel to a load, and a bypass switch coupled between the first end of the inductor and the second end of the inductor, a voltage at a node between the inductor, output capacitor, and the load being an output voltage of the multi-phase DC-DC switching voltage regulator, the method comprising: determining that the output voltage exceeds an overvoltage threshold for a programmable number of cycles, the programmable number of cycles being one or more cycles; responsive to determining that the output voltage exceeds the overvoltage threshold for the programmable number of plurality of cycles, closing the bypass switch for each of a first plurality of phases. In some embodiments the programmable number of cycles is at least a plurality of cycles.

These and other aspects of the invention are more fully comprehended upon review of this disclosure.

DETAILED DESCRIPTION

A voltage regulator may include a deglitch circuit to remove transient indications of a voltage overshoot from a voltage overshoot signal. In some embodiments the deglitch circuit is programmable, to allow for selection of one of a plurality of lengths of time, less than which a voltage overshoot is considered transient.

In some embodiments the voltage regulator only responds to a voltage overshoot condition if the condition persists for multiple operating cycles of the voltage regulator. In some embodiments the voltage regulator includes a bypass switch for selectively coupling opposing ends of an output inductor to provide a bypass mode, and the voltage regulator responds to the voltage overshoot condition by entering the bypass mode. In some embodiments the voltage regulator responds to the voltage overshoot condition by placing both the high side switch and the low side switch in an open state.

In some embodiments the voltage regulator is a multi-phase voltage regulator that sets a first phase of the multi-phase regulator to bypass mode when a voltage overshoot condition first occurs, but keeps the other phases operating normally until the voltage overshoot condition exists for a predefined period of time. If the voltage overshoot condition continues for a discrete number of operating cycles, however, the voltage regulator sets additional phases, and in some embodiments all of the rest of the phases, to bypass mode. In some embodiments the voltage regulator does so for at least a predefined number of cycles. In some embodiments the voltage regulator does so for at least a predefined number of cycles after the voltage overshoot condition abates.

Figure 1:
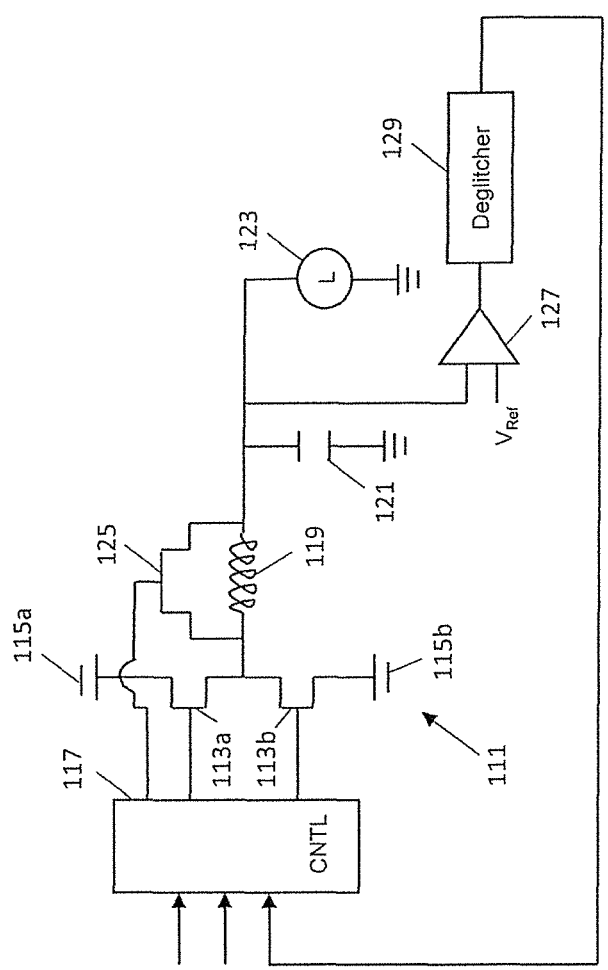
FIG. 1 is a semi-schematic, semi-block diagram of portions of a voltage regulation circuit and load in accordance with aspects of the invention.

FIG. 1 is a semi-schematic, semi-block diagram of portions of a voltage regulation circuit and load in accordance with aspects of the invention. In the embodiment illustrated in FIG. 1, the voltage regulation circuit is a DC-DC switching converter 111. The DC-DC switching converter includes a high side switch 113a and a low side switch 113b, connected in series between a higher voltage source 115a and a lower voltage source 115b. In some embodiments the higher voltage source is a power supply source, and in some embodiments the lower voltage source is a ground. The high side switch and the low side switch are commanded to change states by a controller 117. In various embodiments the controller operates the switches in a normal mode using pulse width modulation and/or pulse frequency modulation, with generally either only one or none of the high side and low side switches being closed at any given time. The controller may be in the form of a processor, for example, but in many instances the controller is instead or in addition implemented using discrete circuit implementations.

An output inductor 119 has a first end coupled to a node between the high side switch and the low side switch. A second end of the inductor is coupled to an output capacitor 121 in parallel to a load 123. In addition, the voltage regulation circuit includes a bypass switch 125 coupling the first end and second end of the output inductor. The bypass switch, like the high side switch and the low side switch, is controlled by the controller. In various embodiments the controller may operate the switches in a bypass mode, in which the bypass switch is closed and the high side and low side switches open.

A comparator 127 has first input coupled to the second end of the output inductor, with a second input coupled to a reference voltage. The first input provides an indication of voltage provided to the load, a voltage that may be considered an output voltage of the voltage regulation circuit. In the embodiment of FIG. 1, the first input is directly connected to the second end of the output inductor, and therefore the indication of output voltage is output voltage in FIG. 1. In various embodiments, however, other circuit elements may be interposed between the second end of the output inductor and the first input, with the other circuit elements having a known effect, at least at times, with respect to signals provided to the first input of the comparator. The reference voltage provided to the second input is, in most embodiments, indicative of a maximum voltage intended to be supplied to the load. Output of the comparator, therefore, indicates whether or not the voltage supplied to the load is over a desired voltage level, which may be considered a voltage overshoot condition, and the output of the comparator may be considered a voltage overshoot indicator.

The voltage overshoot indicator is provided to a deglitch circuit 129. The deglitch circuit, which may be termed a deglitcher, smooths the voltage overshoot indicator by removing temporary indications of voltage overshoot, for example indications of voltage overshoot that last for less than a predefined time period or, in various embodiments, a programmable time period. In some embodiments the deglitch circuit has a delay line and logic elements to determine if the voltage overshoot indicator indicates a voltage overshoot greater than the period of time. Output of the deglitch circuit may be termed a smoothed voltage overshoot signal (although in most embodiments smoothing is only done for overshoot indications)

The smoothed voltage overshoot signal is provided to the controller. In some embodiments, although not explicitly illustrated in FIG. 1, the voltage overshoot indicator may also be provided to the controller, for example either directly or through the deglitch circuit. In various embodiments the controller uses the smoothed voltage overshoot signal, and the voltage overshoot signal in some embodiments, in determining operation of the high side, low side, and bypass switches. In some embodiments the controller sets the high side and low side switches to off and sets the bypass switch to on during time periods in which the smoothed voltage overshoot signal indicates a voltage overshoot.

Figure 2:
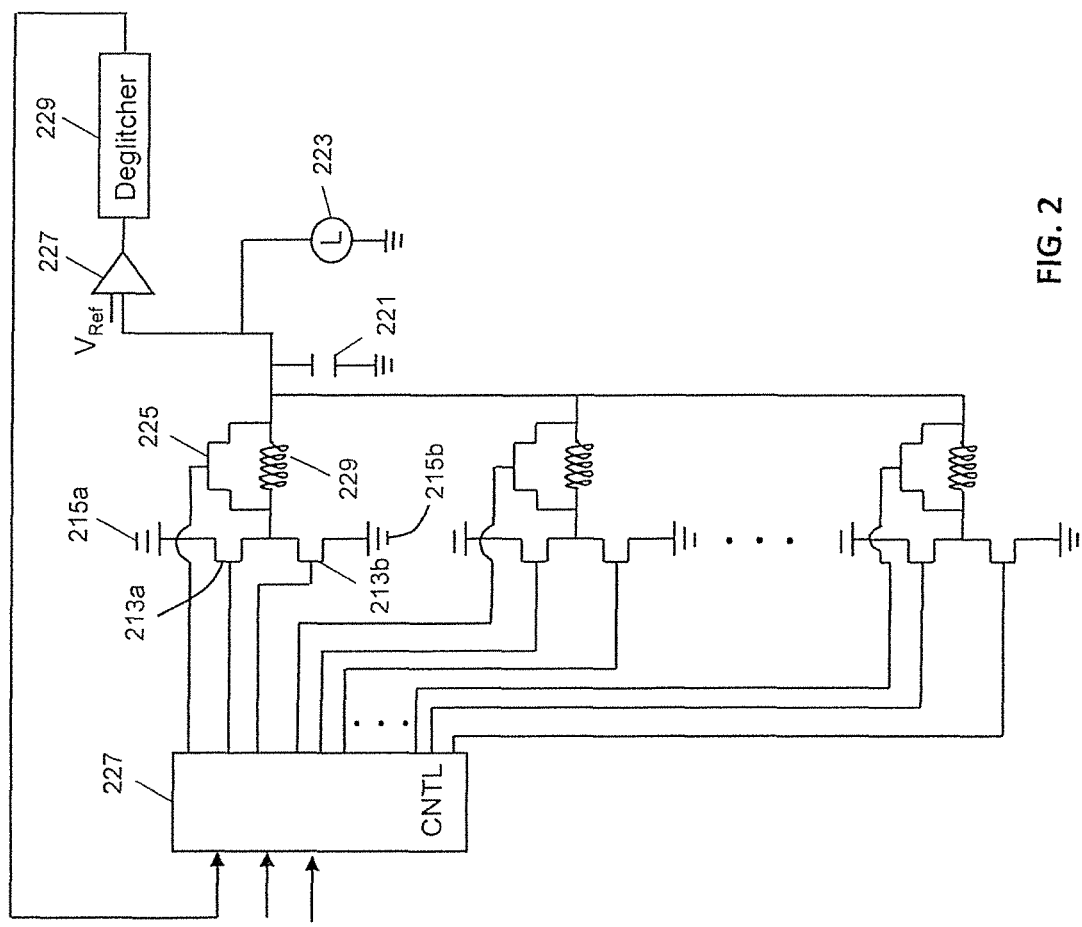
FIG. 2 is a semi-schematic, semi-block diagram of portions of a further voltage regulation circuit and load in accordance with aspects of the invention.

FIG. 2 is a semi-schematic, semi-block diagram of portions of a further voltage regulation circuit and load in accordance with aspects of the invention. The embodiment of FIG. 2 is similar to the embodiment of FIG. 1, but the embodiment of FIG. 2 provides multi-phase power to the load. Accordingly, in the embodiment illustrated in FIG. 2, a plurality of voltage regulation circuits are present, illustrated in the form of DC-DC switching converters 211a-n. Each of the DC-DC switching converters includes a high side switch 213a and a low side switch 213b (with reference numbers for only a first DC-DC switching converter 211a shown in FIG. 2), connected in series between a higher voltage source 215a and a lower voltage source 215b. In some embodiments the higher voltage source is a power supply source, and in some embodiments the lower voltage source is a ground. The high side switch and the low side switch are commanded to change states by a controller 217. In most embodiments the controller operates the switches for different ones of the DC-DC switching converters at different times, so that for example the operation of the converters may be considered to be operating at different phases. In various embodiments the controller operates the switches using pulse width modulation and/or pulse frequency modulation, with generally either only one or none of the high side and low side switches being closed at any given time. The controller may be in the form of a processor, for example, but in many instances the controller is instead or in addition implemented using discrete circuit implements.

As in the embodiment illustrated in FIG. 2, for each switching converter, an output inductor 219 has a first end coupled to a node between the high side switch and the low side switch. A second end of the inductor is coupled to an output capacitor 221 in parallel to a load 223. In addition, each switching converter includes a bypass switch 225 coupling the first end and second end of the output inductor. The bypass switch, like the high side switch and the low side switch, is controlled by the controller.

As with the embodiment of FIG. 1, in the embodiment illustrated in FIG. 2 a comparator 227 has first input coupled to the second ends of the output inductors, with a second input coupled to a reference voltage. The first input provides an indication of voltage provided to the load, a voltage that may be considered an output voltage of the voltage regulation circuit. Also as with the embodiment of FIG. 1, in the embodiment illustrated in FIG. 2 the first input is directly connected to the second end of the output inductor, and therefore the indication of output voltage is output voltage in FIG. 1. In various embodiments, however, other circuit elements may be interposed between the second end of the output inductor and the first input, with the other circuit elements having a known effect, at least at times, with respect to signals provided to the first input of the comparator. The reference voltage provided to the second input is, in most embodiments, indicative of a maximum voltage intended to be supplied to the load. Output of the comparator, therefore, indicates whether or not the voltage supplied to the load is over a desired voltage level, which may be considered a voltage overshoot condition, and the output of the comparator may be considered a voltage overshoot indicator.

The voltage overshoot indicator is provided to a deglitch circuit 229. The deglitch circuit, which may be termed a deglitcher, smooths the voltage overshoot indicator by removing temporary indications of voltage overshoot, for example indications of voltage overshoot that last for less than a predefined time period or, in various embodiments, a programmable time period. In some embodiments the deglitch circuit has a delay line and logic elements to determine if the voltage overshoot indicator indicates a voltage overshoot greater than the period of time. Output of the deglitch circuit may be termed a smoothed voltage overshoot signal (although in most embodiments smoothing is only done for overshoot indications)

The smoothed voltage overshoot signal is provided to the controller. In some embodiments, although not explicitly illustrated in FIG. 2, the voltage overshoot indicator may also be provided to the controller. The voltage overshoot indicator may be provided directly to the controller, for example, or by the deglitch circuit. In various embodiments the controller uses the smoothed voltage overshoot signal, and the voltage overshoot signal in some embodiments, in determining operation of the high side, low side, and bypass switches. In some embodiments the controller sets, for various phases, the high side and low side switches to off and sets the bypass switch to on during time periods in which the smoothed overshoot signal indicates a voltage overshoot. In some embodiments, the controller sets the high side and low side switches to off and the bypass switch to on for one phase of the plurality of phases whenever the voltage overshoot signal indicates a voltage overshoot, sets the high side and low side switches to off and the bypass switch to on for further phases if the smoothed voltage overshoot indicator indicates a voltage overshoot, and sets the high side and low side switches to off and the bypass switch to on for additional phases if the smoothed voltage overshoot indicator indicates a voltage overshoot has continued for a predetermined number of cycles. In some such embodiments, one phase may be returned to a normal, or non-bypass, operating mode immediately once the voltage overshoot indicator (or smoothed voltage overshoot indicator, in some embodiments) no longer indicates a voltage overshoot. In such embodiments, other phases in bypass mode may not be returned to a normal or non-bypass mode, until a predefined or programmable number of further cycles have passed.

Figure 3:
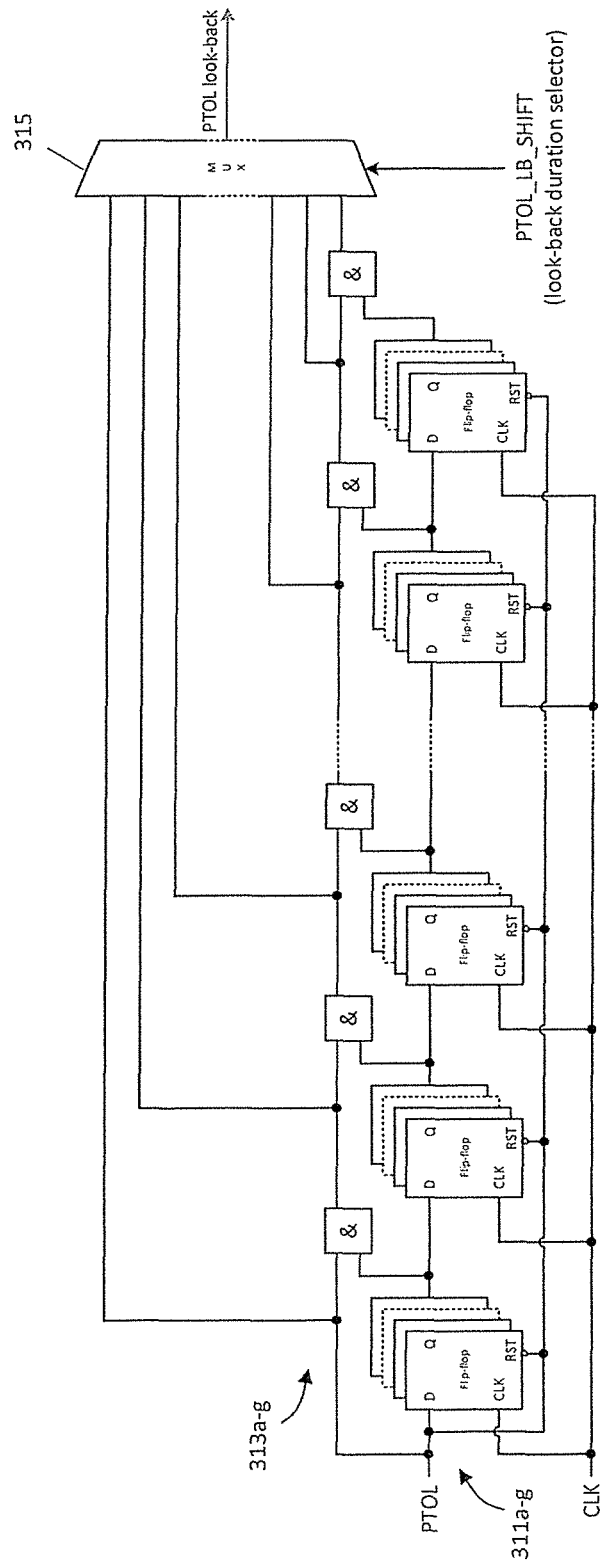
FIG. 3 is a schematic of a deglitcher in accordance with aspects of the invention.

FIG. 3 is a schematic of a deglitcher in accordance with aspects of the invention. The deglitcher includes one or more series of flip-flops 311*a-g*. A series of flip-flops is provided for each phase of a multi-phase voltage regulator; if the voltage regulator has only a single phase then only one series of flip-flops may be provided. A voltage overshoot signal, PTOL, is an input to the series of flip-flops, with the voltage overshoot signal also resetting the flip-flops when the voltage overshoot signal goes low. Each of the flip-flops, other than an ultimate flip-flop 311*g* in the series, provides its output to a subsequent flip-flop in the series. In some embodiments each of the flip-flops also provides its output to a corresponding AND gate 313*a-g* of one or more series of AND gates (although only one series of AND gates is shown in FIG. 3 for clarity of the figure). The AND gates also receive as an input the output of a prior AND gate in the series, other than a first AND gate 313*a* of the series, which receives the voltage overshoot signal as an input.

The flip-flops, may be, for example clocked using a 300 MHz clock signal, which, in various embodiments, is three times faster than a system clock used for clocking the voltage overshoot signal. Accordingly, in some embodiments the series of flip-flops may be considered to be clocked at an overclocked rate. In some embodiments, however, the series of flip-flops may be clocked at the system clock rate.

For each series, outputs of each of the AND gates are also provided to a multiplexer 315, with a multiplexer provided for each series in some embodiments. Considering the arrangement of the AND gates, a high output from a particular AND gate indicates that the voltage overshoot indicator is high, and has been high for a predetermined number of cycles, with the number of cycles dependent on which of the latches provides an output to the particular AND gate. The multiplexer therefore provides as its output a signal indicating a number of cycles for which the voltage overshoot indicator has been high, with the number of cycles dependent on the selector signal to the multiplexer.

Figure 4:
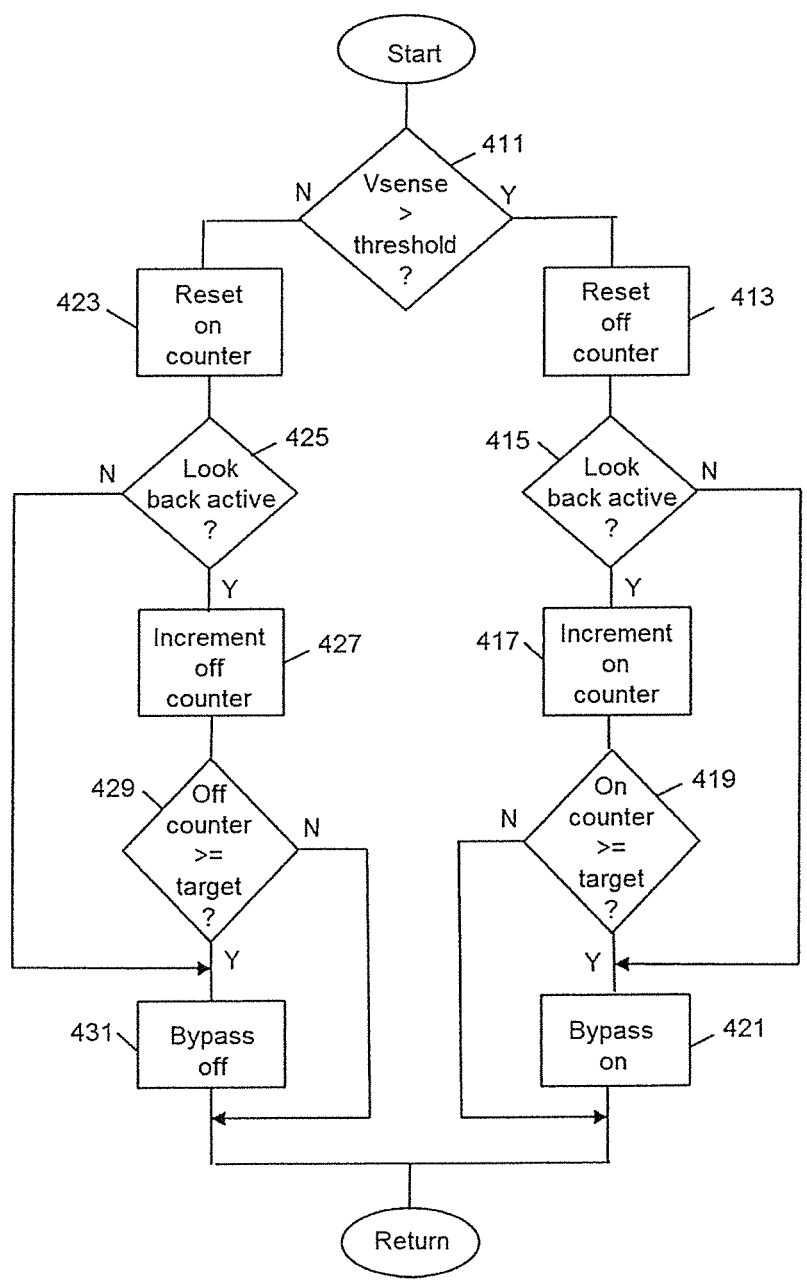
FIG. 4 is a flowchart of a process for bypass switch control with look-back operations for a single phase of a voltage regulator in accordance with aspects of the invention.

FIG. 4 is a flowchart of a process in accordance with aspects of the invention. The process is meant to be exemplary only, and in various embodiments general concepts of the process may be implemented in other fashions, and may account for various circumstances that might occur during operation. In some embodiments the process is executed by voltage regulation circuitry. In some embodiments the process is performed by the voltage regulation circuit of FIG. 1 or FIG. 2. In some embodiments the process is performed by the controller for the voltage regulation circuit of FIG. 1 or FIG. 2. In some embodiments the process is used to control, in part, operations of a DC-DC switching converter. In some embodiments the DC-DC switching converter includes a bypass switch for coupling ends of an output inductor, with the switching converter having a bypass mode in which a high side switch and a low side switch are open while the bypass switch is closed.

The process of FIG. 4 determines state of a bypass switch for a single phase of a voltage regulator, which may be an only phase of a voltage regulator in some embodiments. The embodiment of FIG. 4, as illustrated, includes operations for both setting the bypass switch on and off taking into account whether a look-back mode is active. In some embodiments a look-back mode may be operative or available for either turning on or turning off the bypass switch.

In block 411 the process determines if voltage provided to a load is over a voltage threshold. The voltage threshold may be, for example, a desired operating voltage for the load, or a set amount over the desired operating voltage for the load. In some embodiments the desired operating voltage for the load may vary over time, for example due to dynamic voltage scaling operations.

If voltage provided to the load is over the threshold voltage, the voltage overshoot indicator may be considered to be set to high, and the process proceeds to a chain of operations beginning with block 413. In block 413 the process resets an OFF counter (which is applicable to situations where there is no overshoot condition, and which is discussed later with respect to a chain of operations beginning with block 423). In block 415 the process determines if a look-back mode is active, for the regulator if a single phase regulator, or for a particular phase of the regulator if a multiphase regulator. In the look-back mode, the process delays some or all of operation of a bypass switch of the voltage regulator. If the look-back mode is active, the process continues to block 417. Otherwise the process goes to block 421.

In block 417 the process increments an ON counter. In some embodiments the ON counter is indicative of a number of clock cycles for which the voltage overshoot indicator is greater than the threshold. In block 419 the process determines if the ON counter is greater than a predefined number, which may be considered a target number of cycles or a number of cycles by which operation of the bypass switch is to be delayed. In FIG. 4, the predefined number may be one, but in various embodiments the predefined number may be a different predefined number, and in some embodiments the predefined number is a programmable number.

In various embodiments the ON counter and the comparison of block 419 may not be explicitly implemented or performed. Instead, for example, the process may determine if the voltage overshoot indicator has been high for a number of cycles. For example, this may be accomplished using the example deglitch circuit of FIG. 3, or other circuitry.

If the ON counter is not greater than the predefined number (or the voltage overshoot indicator has not been high for the requisite number of cycles), the process returns. If the ON counter is greater than the predefined number (or the voltage overshoot indicator has been high for the requisite number of cycles), the process continues to block 421.

In block 421, the process sets the voltage regulator to the bypass mode. In some embodiments the voltage regulator is a multi-phase voltage regulator, and in block 421 only a single phase of the multi-phase voltage regulator is set to bypass mode, and the process of FIG. 4 may be performed separately for each phase of the multiphase regulator. The process therefore returns.

In block 423 the process resets the ON counter. In block 425 the process determines if a look-back mode is active, for the regulator if a single phase regulator, or for a particular phase of the regulator if a multiphase regulator. In some embodiments the look-back mode may be separately active for setting the bypass switch ON and for setting the bypass switch OFF. Further, in some embodiments there may be no look-back mode for setting the bypass switch OFF. If the look-back mode is active, the process continues to block 427. Otherwise the process goes to block 431.

In block 427 the process increments an OFF counter. In some embodiments the OFF counter is indicative of a number of clock cycles for which the voltage overshoot indicator is less than or equal to the threshold. In block 429 the process determines if the OFF counter is greater than a predefined number, which may be considered a target number of cycles or a number of cycles by which operation of the bypass switch is to be delayed. In FIG. 4, the predefined number may be one, but in various embodiments the predefined number may be a different predefined number, and in some embodiments the predefined number is a programmable number.

In various embodiments the OFF counter and the comparison of block 429 may not be explicitly implemented or performed. Instead, for example, the process may determine if the voltage overshoot indicator has been high for a number of cycles. For example, this may be accomplished using the example deglitch circuit of FIG. 3, or other circuitry.

If the OFF counter is not greater than the predefined number (or the voltage overshoot indicator has not been low for the requisite number of cycles), the process returns. If the OFF counter is greater than the predefined number (or the voltage overshoot indicator has been low for the requisite number of cycles), the process continues to block 431.

In block 431, the process turns off the bypass mode. In some embodiments the voltage regulator is a multi-phase voltage regulator, and in block 431 bypass mode for only a single phase of the multi-phase voltage regulator is set to bypass mode, and the process of FIG. 4 may be performed separately for each phase of the multiphase regulator. The process therefore returns.

Figure 5:
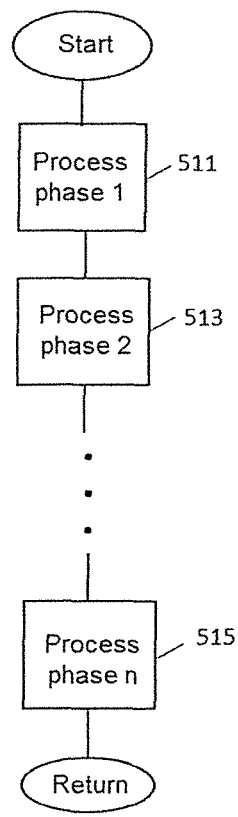
FIG. 5 is a flowchart of a further process in accordance with aspects of the invention.

FIG. 5 is a flowchart of a process in accordance with aspects of the invention. The process is meant to be exemplary only, and in various embodiments general concepts of the process may be implemented in other fashions, and may account for various circumstances that might occur during operation. In some embodiments the process is executed by voltage regulation circuitry. In some embodiments the process is performed by the voltage regulation circuit of FIG. 2. In some embodiments the process is performed by the controller for the voltage regulation circuit of FIG. 2. In some embodiments the process is used to control, in part, operations of a multiphase DC-DC switching converter. In some embodiments the multiphase DC-DC switching converter includes, for each phase, a bypass switch for coupling ends of an output inductor, with the switching converter having a bypass mode in which a high side switch and a low side switch are open while the bypass switch is closed.

In block 511 the process determines a state for a bypass switch of a first phase of the multiphase switching converter. In some embodiments the process determines whether the bypass switch of the first phase should be open or closed based on whether output voltage of the switching converter is above a threshold voltage, whether the first phase is in a look back mode (which may be considered a deglitch mode), and, if so, an extent of time since the output voltage of the switching converter went above (or below in some embodiments) the threshold voltage. In some embodiments the process determines the state for the bypass switch of the first phase by performing operations of the process of FIG. 4, or some of them. For example, in some embodiments the process may perform all of the operations of the process of FIG. 4 for the first phase, while in other embodiments the look back mode may not apply to setting the bypass switch to an off state, and the process may not perform look back related operations for setting the bypass switch to the off state.

In block 513 the process determines a state for a bypass switch of a second phase of the multiphase switching converter. As in block 511, in some embodiments the process determines whether the bypass switch of the second phase should be open or closed based on whether output voltage of the switching converter is above a threshold voltage, whether the second phase is in a look back mode (which may be considered a deglitch mode), and, if so, an extent of time since the output voltage of the switching converter went above (or below in some embodiments) the threshold voltage. Also as in block 511, in some embodiments the process determines the state for the bypass switch of the second phase by performing operations of the process of FIG. 4, or some of them. For example, in some embodiments the process may perform all of the operations of the process of FIG. 4 for the second phase, while in other embodiments the look back mode may not apply to setting the bypass switch to an off state, and the process may not perform look back related operations for setting the bypass switch to the off state.

The process continues to determine states for bypass switches of each other phase of the multiphase switching converter, which for an n-phase multiphase switching converter concludes with determining a state for a bypass switch of the nth phase in block 515. The operations of block 515 are as discussed with respect to block 511 and 513, but for the nth phase.

The process thereafter returns.

Aspects relating to embodiments of the invention may be further comprehended considering the graphs of FIGS. 6-9.

Figure 6:
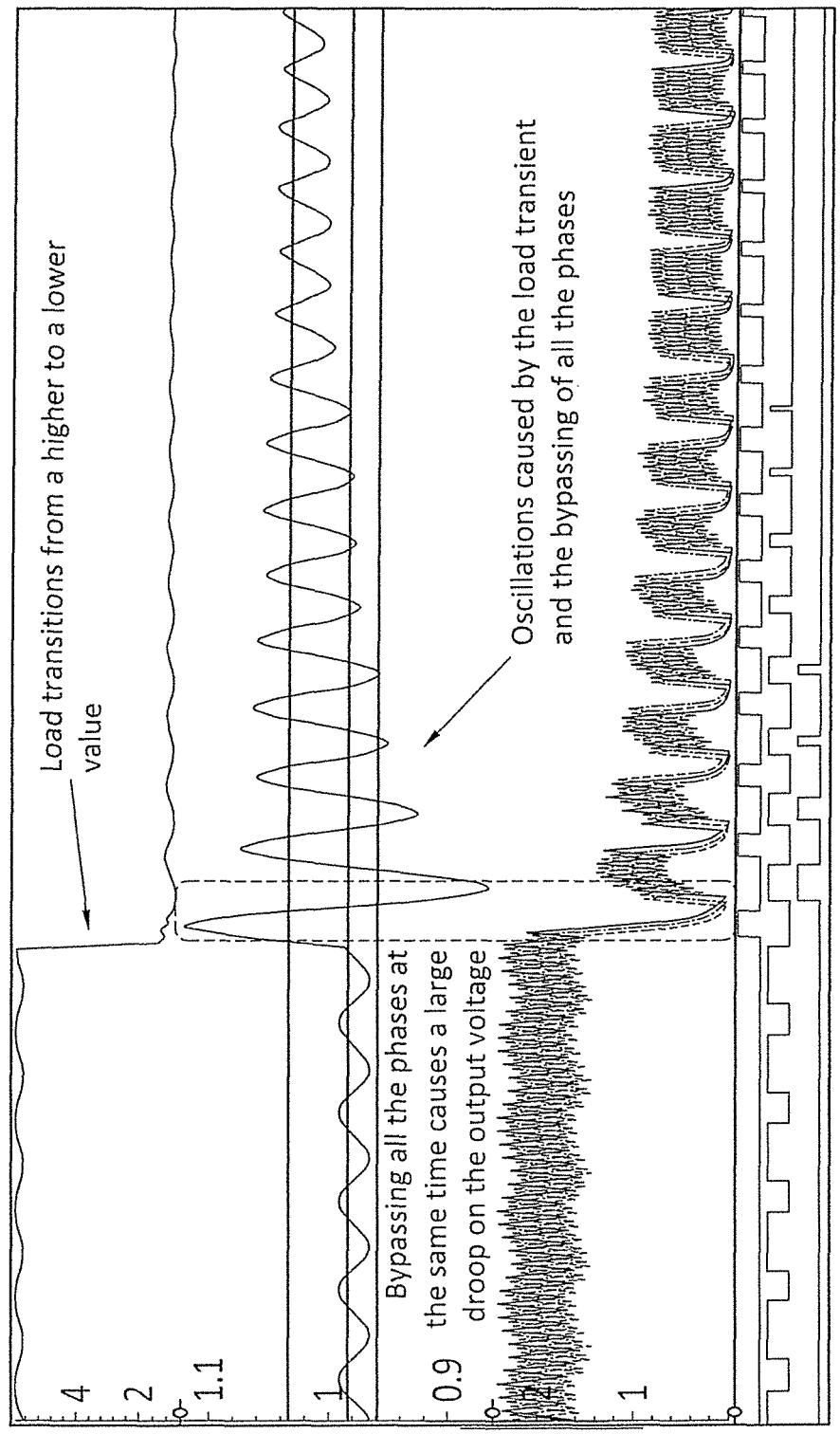
FIG. 6 provides graphs relating to operations of a multi-phase voltage regulator, with the graphs showing oscillations in output voltage after a drop in load current.

FIG. 6 shows representations of load current, regulator output voltage and phase currents over time for a multiphase voltage regulator without look-back operation. As may be seen in the graph, output voltage of the regulator oscillates after a load current drops. The oscillations are in part due to operation of the bypass switches for the various phases as the output voltage increases above a predetermined level upon the drop in load current.

Figure 7:
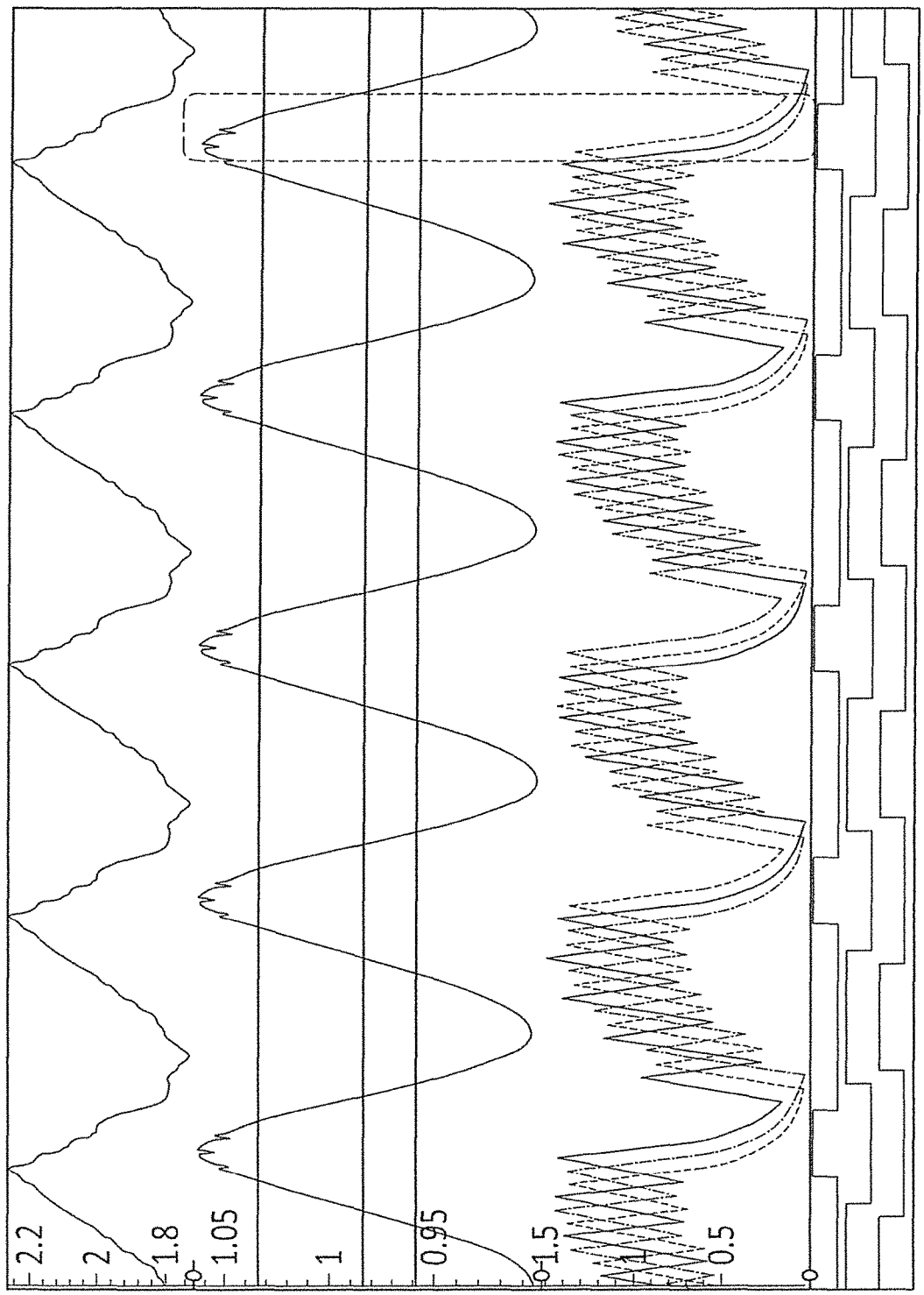
FIG. 7 provides further graphs relating to oscillations in output voltage of a voltage regulator in a situation with a load between load ranges of voltage regulator operating modes.

FIG. 7 shows load current, voltage regulator output voltage, and phase currents, this time while the regulator is operating at a load in a range between ranges of optimization for different regulator modes. In this case, operating all bypass switches at the same time maintaining oscillations in the output voltage.

Figure 8:
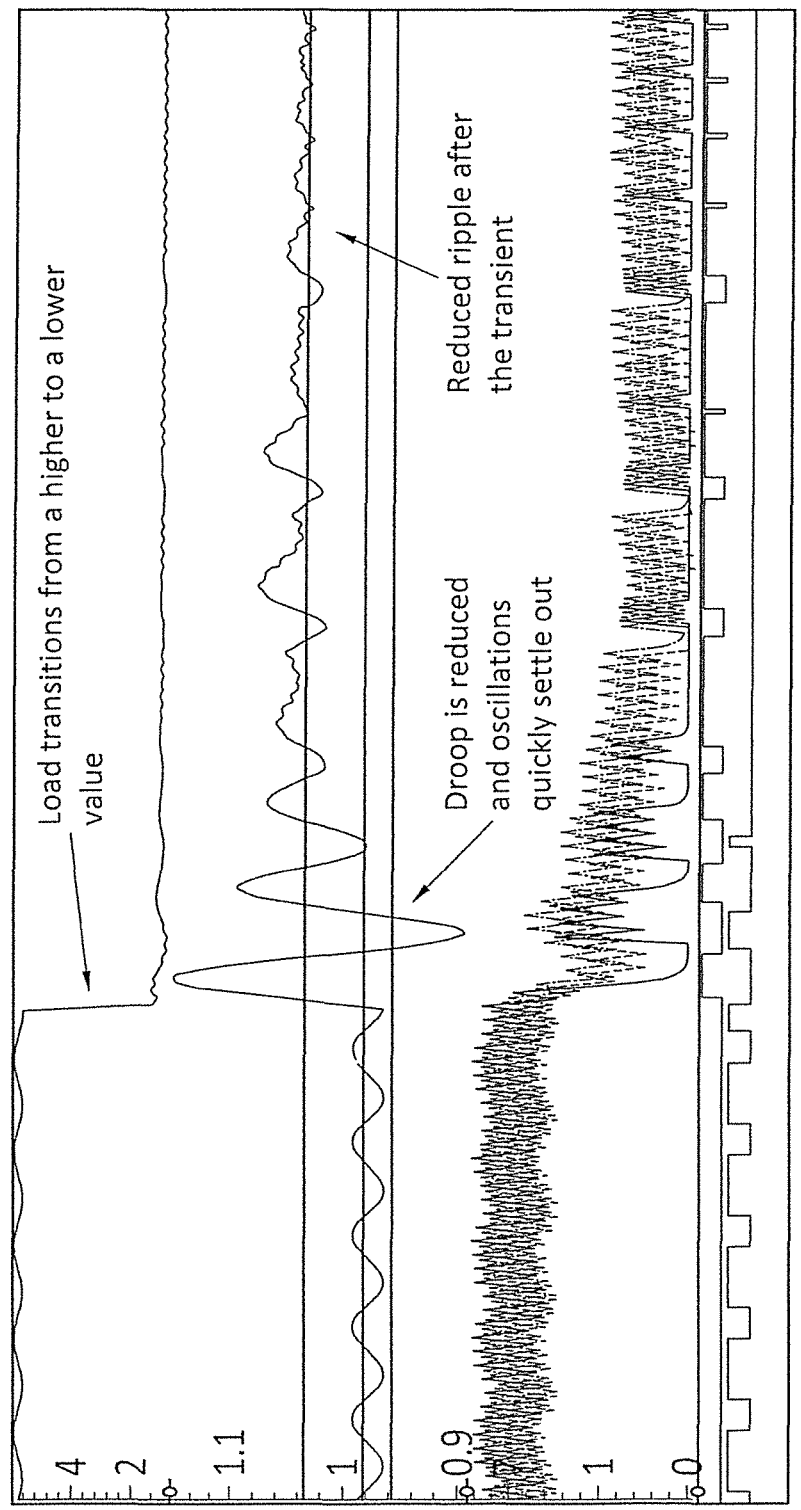
FIG. 8 provides graphs illustrating aspects of compensation of output voltage oscillations of a voltage regulator after a drop in load current in accordance with aspects of the invention.

FIG. 8 is a counterpart to FIG. 6, showing results of operation of a voltage regulator implementing look-back modes for the bypass switch. As shown in FIG. 8, oscillation of the output voltage is reduced when using the look-back modes.

Figure 9:
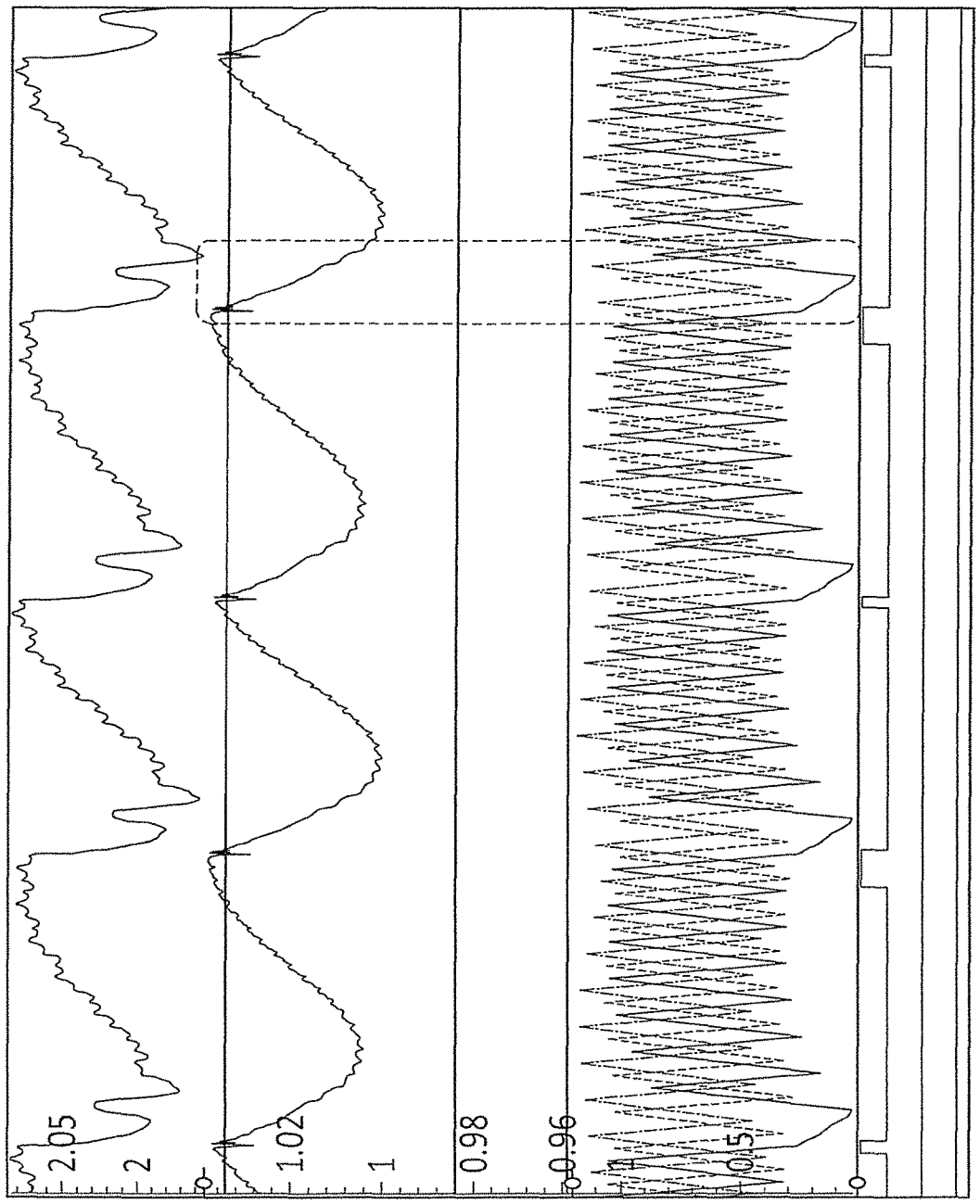
FIG. 9 provides further graphs illustrating aspects of compensation of output voltage oscillations of a voltage regulator in a situation with a load between load ranges of voltage regulator operating modes in accordance with aspects of the invention.

FIG. 9 similarly shows a counterpart to FIG. 3, utilizing look-back mode. Again, voltage oscillations are reduced using look-back mode.

Figure 10:
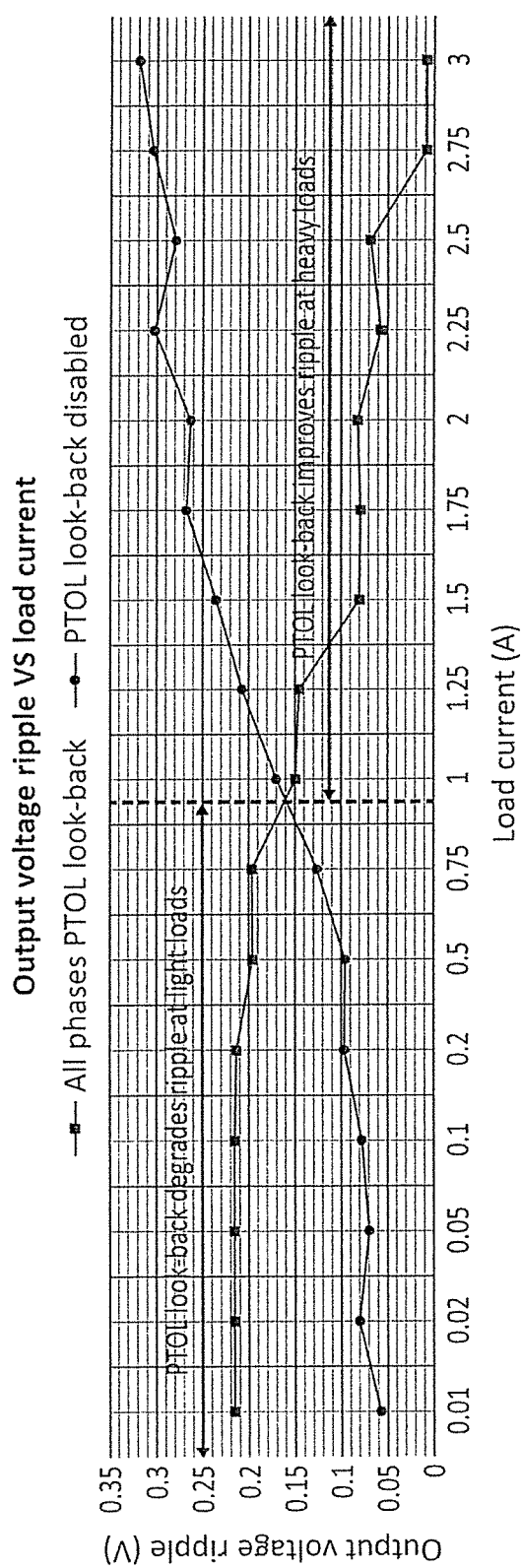
FIG. 10 is a graph showing output voltage ripple against load current with and without look-back modes.

FIG. 10 shows output voltage ripple against load current, with and without a look back feature for operation of the bypass switch of the voltage regulator. As indicated in FIG. 10, at higher load currents voltage output ripple is reduced when using the look back feature. However, at lower load currents voltage output ripple may actually increase with use of the look back feature. In some embodiments, therefore, and for example as discussed with respect to FIGS. 12-14, the look back feature may be disabled, or fewer phases placed in look back mode, in lighter loading conditions.

Figure 11A:
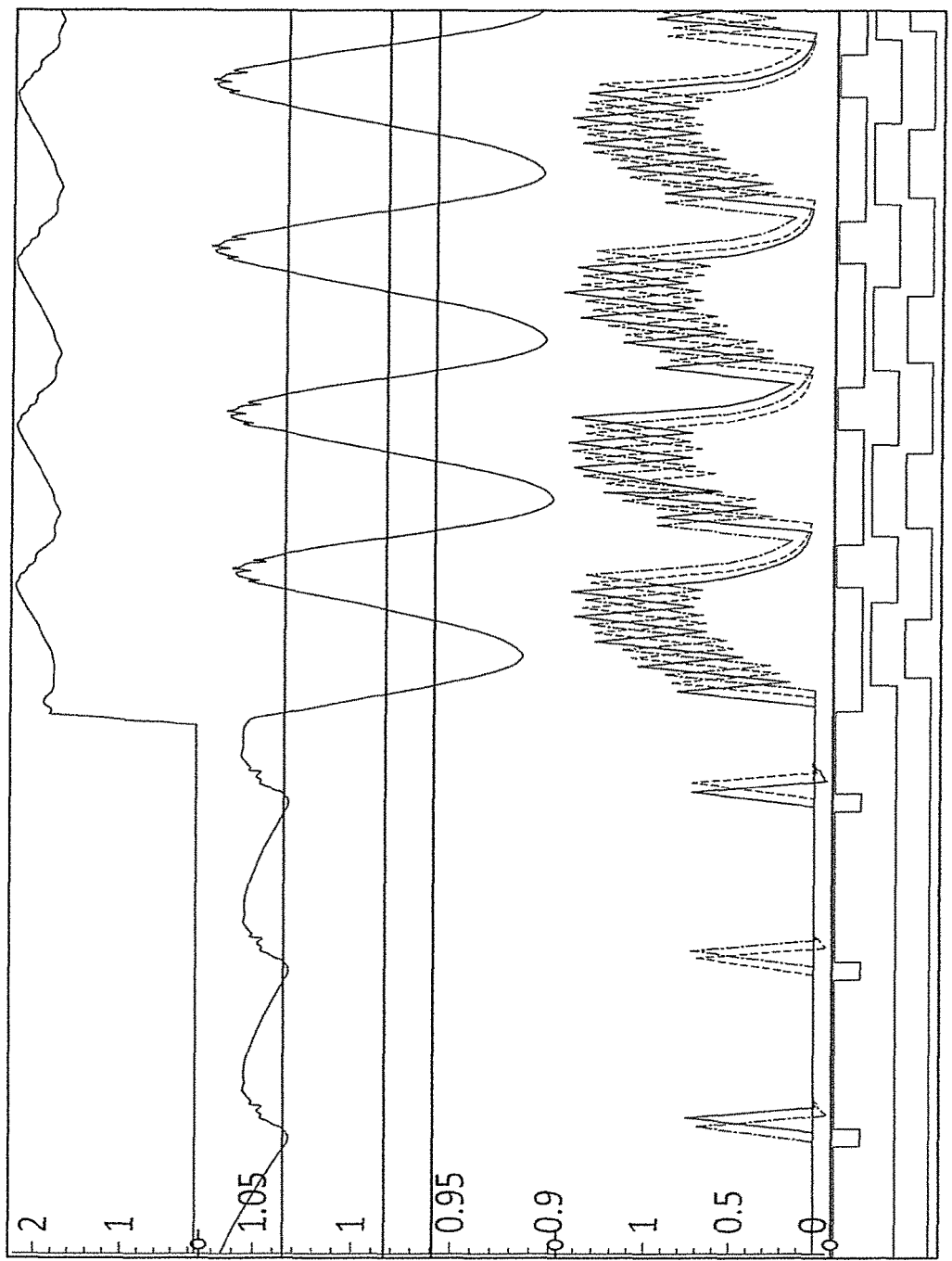
FIGS. 11a and 11b are graphs illustrating load related transients with and without a look-back safety mechanism.
Figure 11B:
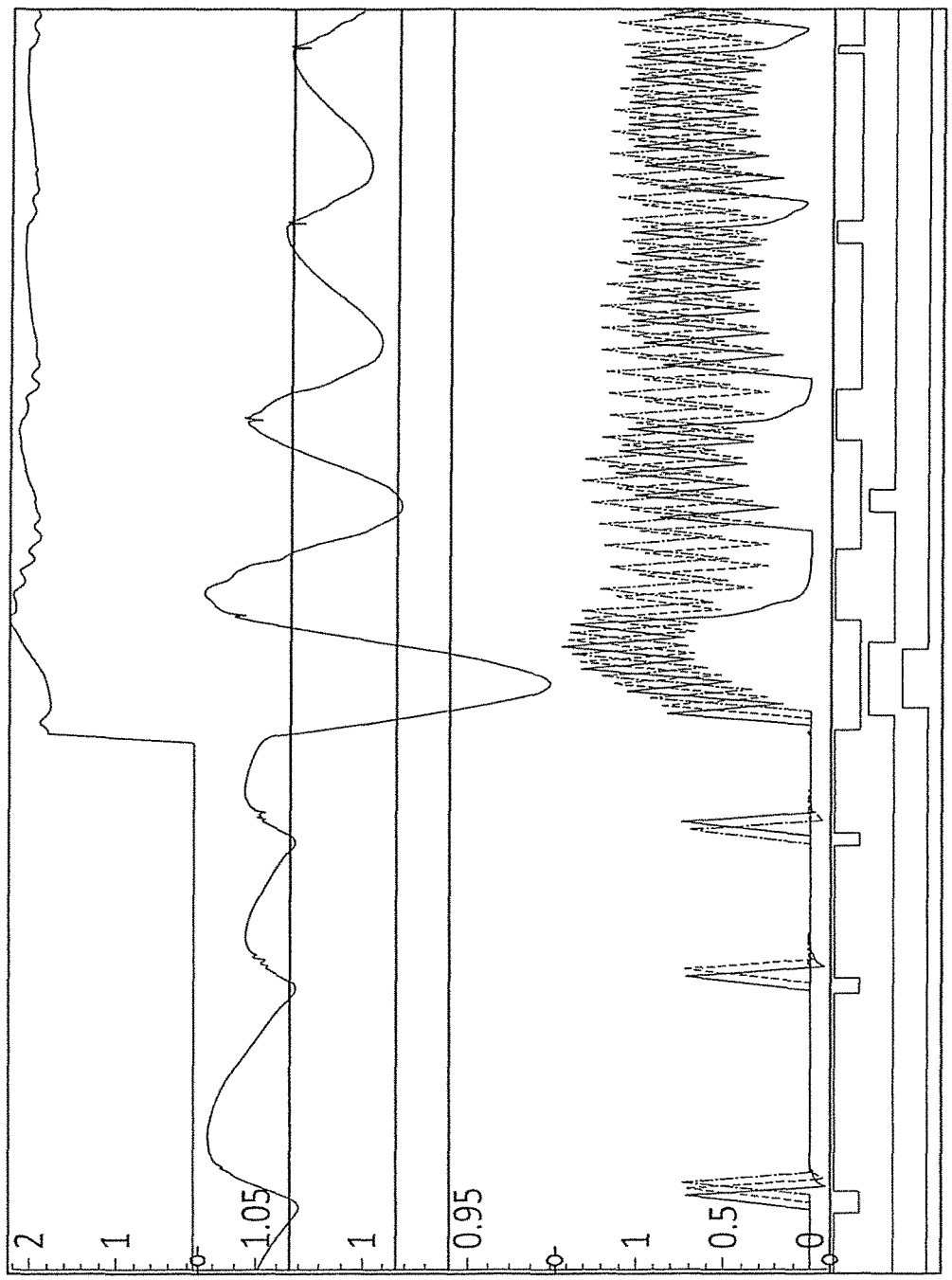

A transition from a lighter loading condition to a heavier loading condition with the loop back feature disabled may result in increased output voltage ripples. This is shown in the graph of FIG. 11a, with large oscillations in output voltage after a sudden increase in load current. Such increases in load current often also result in an output voltage droop situation. In some embodiments, therefore, a "safety" mechanism is provided, for example as discussed with respect to FIGS. 12 and 13. The "safety" mechanism place a predetermined number of phases, for example all phases of a multiphase voltage regulator, in loop back mode upon the occurrence of a voltage droop event.

Figure 12:
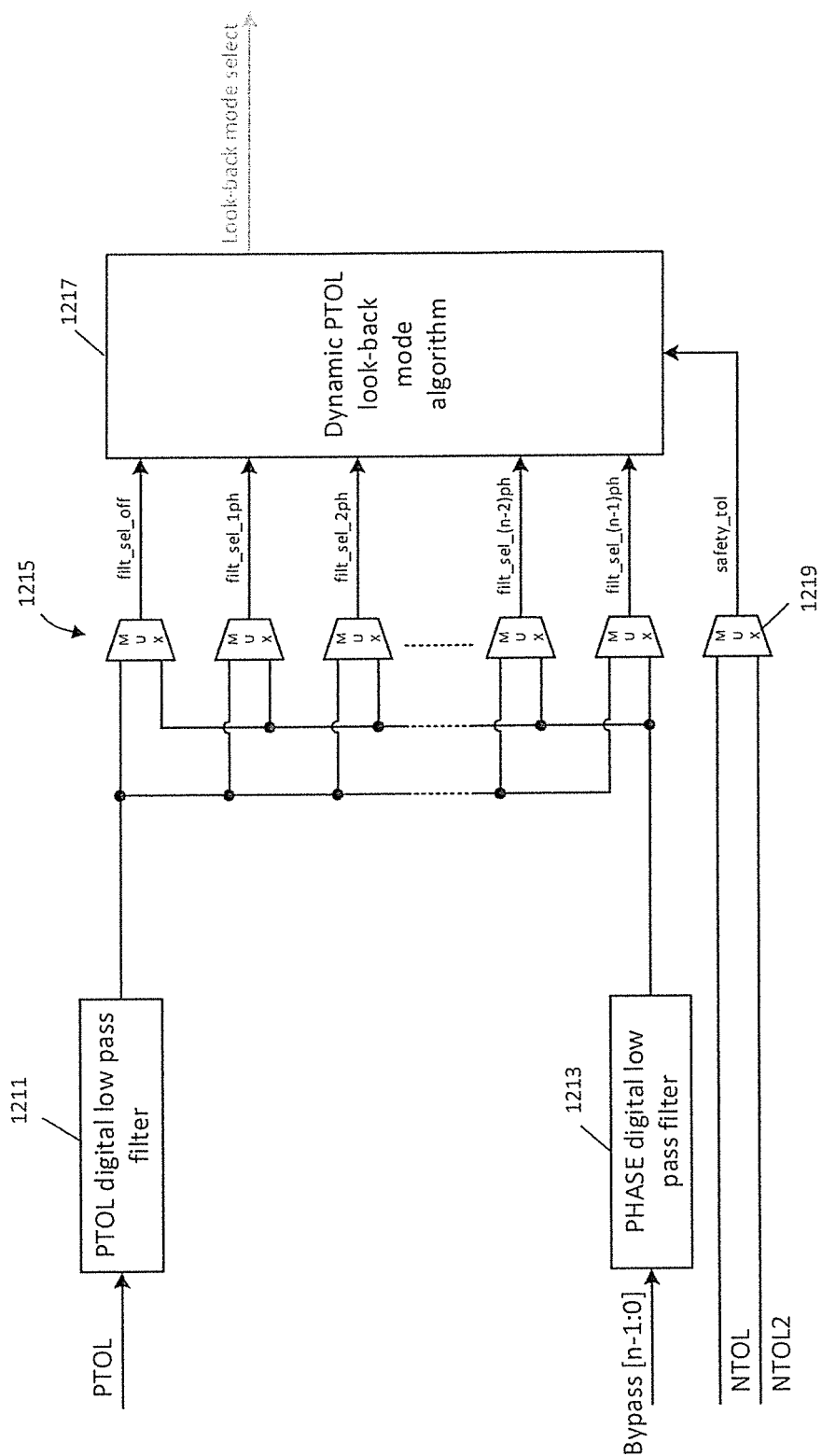
FIG. 12 is a block diagram of circuitry for determining a number of phases to be in look back mode.

Some embodiments include a dynamically determining a number of phases to be in look back mode. For example, FIG. 12 is a block diagram of circuitry for determining a number of phases to be in look back mode.

Block 1211 is a low pass filter. The low pass filters receives a signal indicative of whether voltage of DC-DC switching converter, or voltage regulator, is above an overvoltage threshold. Block 1213 is also a low pass filter, or a plurality of low pass filters. Block 1213 receives signals indicative of whether bypass is on for each of the plurality of phases. The outputs of the filters are provided to a logic block 1217, by way of multiplexers 1215. In some embodiments the multiplexers provide different outputs of the filters to the logic block based on a number of phases in look back mode, in some embodiments the outputs of the filters are provided to the logic block based on whether any of the phases are in look back mode. The logic block determines a number of phases to be in look back mode based on the filtered. In the embodiment of FIG. 12, a further multiplexer provides one of two undervoltage indicators to the logic block, for use by the logic block in a safety mode.

Figure 13:
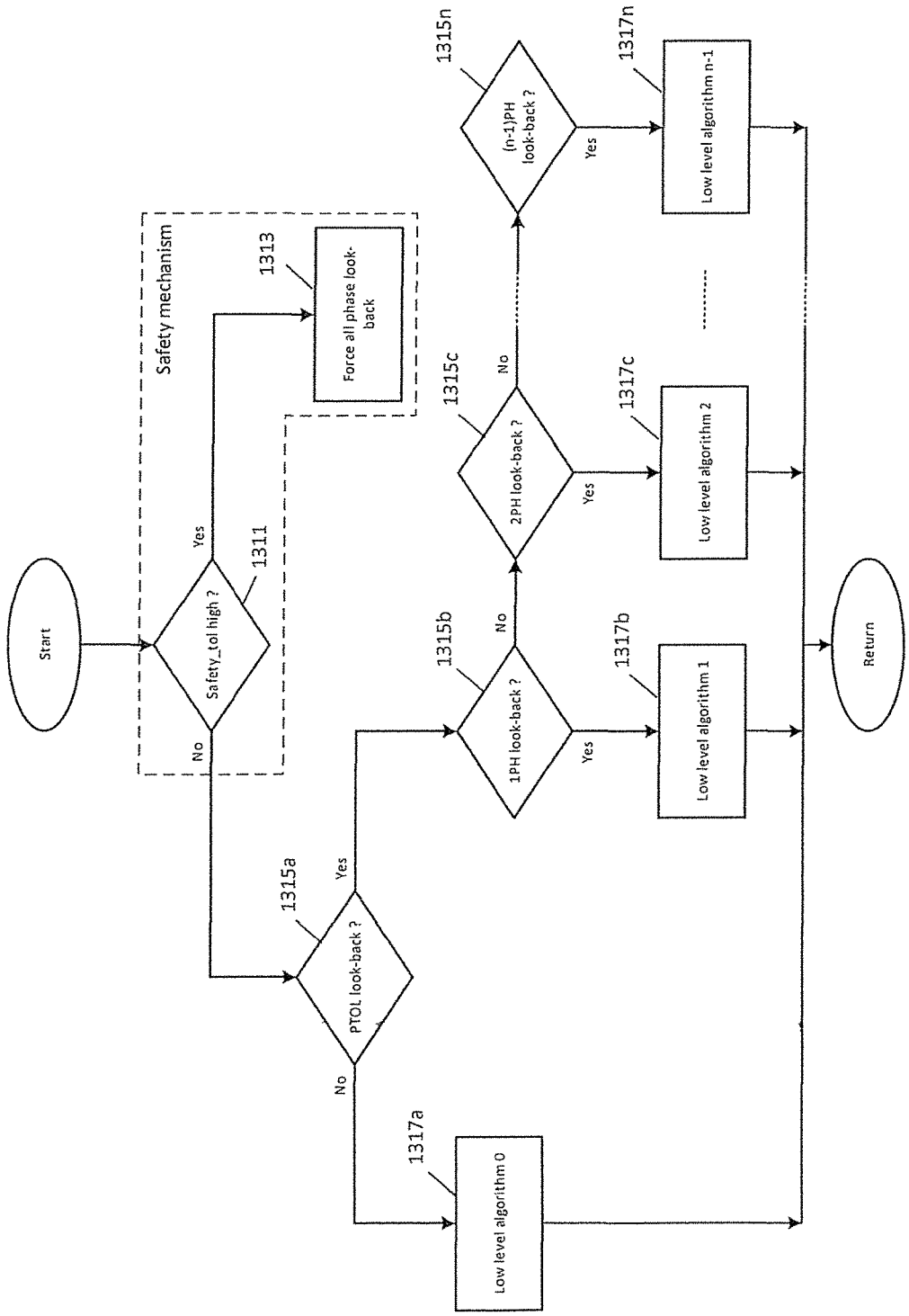
FIG. 13 is a flowchart of a process in accordance with aspects of the invention.

FIG. 13 is a flowchart of a process in accordance with aspects of the invention. In some embodiments the process is used in determining whether phases of a voltage regulator should be in a look back mode. In addition, the process may optionally include a safety operation, for placing all phases in look back mode for example, and for illustrative purposes the optional safety operation is illustrated in FIG. 13. The process is meant to be exemplary only, and in various embodiments general concepts of the process may be implemented in other fashions, and may account for various circumstances that might occur during operation. In some embodiments the process is performed by circuitry of block 1217 of FIG. 12. In some embodiments the process is executed by voltage regulation circuitry. In some embodiments the process is performed by the voltage regulation circuit of FIG. 1 or FIG. 2. In some embodiments the process is performed by the controller for the voltage regulation circuit of FIG. 1 or FIG. 2. In some embodiments the process is used to control, in part, operations of a multiphase DC-DC switching converter. In some embodiments the multiphase DC-DC switching converter includes, for each phase, a bypass switch for coupling ends of an output inductor, with the switching converter having a bypass mode in which a high side switch and a low side switch are open while the bypass switch is closed. In some embodiments the switching converter is a single phase switching converter, including a bypass switch.

In block 1311 the process determines if a safety operation should be conducted. In some embodiments the process determines the safety operation should be conducted if output voltage of the voltage regulator drops below a predetermined threshold. In some embodiments the predetermined threshold is a voltage reference level at which the output voltage is desired, minus a tolerance voltage. If the process determines the safety operation should be conducted, the process goes to block 1313, and places all phases of the voltage regulator in loop back mode. Otherwise the process goes to block 1315.

In block 1315a the process determines if look back mode is enabled for any of the phases. If so, the process continues to determine how many phases are in look back mode, which is shown in FIG. 13 as successive operations of blocks 1315b-n (for a switching converter having n phases). If not, the process goes to block 1317a and performs operations to determine whether phases of the switching converter should be placed in look back mode. For illustrative purposes, the operations of block 1317a may be considered a low level algorithm 0, with the 0 indicating the number of phases in look back mode upon entry into operations of the block.

Similarly, if at least one phase is already in loop back mode, the process goes to one of blocks 1317b-n, with the selected block determined based on the number of phases then in look back mode. Again for illustrative purposes, operations of blocks 1317b-n may be considered a low level algorithm x, with x indicating the number of phases in look back mode upon entry into operations of the block.

In some embodiment the low level algorithm blocks turn on or off look back mode for various phases depending on current being supplied to the load, with for example greater number of phases in look back mode for higher current levels and fewer number of phases in look back mode for lower current levels. In some embodiments the higher and lower current levels are different depending on a number of phases then in look back mode. In some embodiments the low level algorithm blocks determine a number of phases to be in look back mode based on comparison of an averages of signals for placing the bypass switch in an ON state (indicating output voltage of the switching converter being too high, directly or delayed depending on extent of phases in loop back mode) against sets of predetermined thresholds. In various embodiments the sets of predetermined thresholds are different depending on the number of phases in look back mode.

The process thereafter returns.

Figure 14:
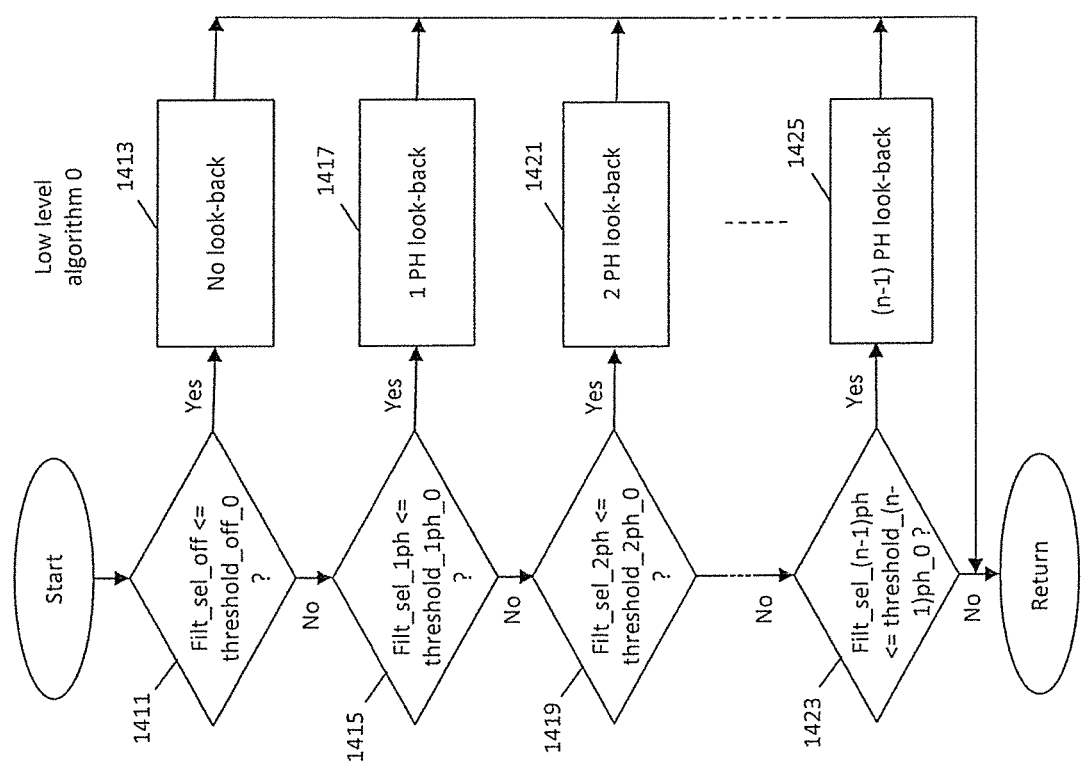
FIG. 14 is a flowchart of an example process for implementing a low level algorithm of the process of FIG. 13.

FIG. 14 is a flowchart of an example process for implementing a low level algorithm of the process of FIG. 13. The example process is labeled for use as low level algorithm 0. The process may be used for any of the low level algorithms, however, by simply changing the constants (e.g. threshold_1ph_0) to the constants for another phase (e.g. threshold_1ph_3, for low level algorithm 3).

In block 1411 the process compares the filtered look back mode signal for look back off to a first threshold. If the filtered look back mode signal for look back off is less than the threshold, look back mode is set to off for all phases in block 1413. If not, a comparison is performed for the filtered look back mode signal for 1 phase look back enabled against a second threshold in block 1415, and if below the second threshold, look back mode is set to enabled for 1 phase. Similar comparisons are made for the further filtered look back mode signals in the chain of blocks 1419 ... 1423, with increasing number of phases put in look back mode depending on which comparison indicates a filtered signal value greater than its corresponding threshold.

The process thereafter returns.

Although the invention has been discussed with respect to various embodiments, it should be recognized that the invention comprises the novel and non-obvious claims supported by this disclosure.

What is claimed is:

1. A voltage regulator, comprising:
at least one phase of a voltage regulator, each phase comprising a high side switch and a low side switch coupled in series between a higher voltage and a lower voltage, with an output inductor having a first end coupled to a node between the high side switch and the low side switch and a second end coupled to a load, with a bypass switch in parallel to the inductor;
an overvoltage comparator for determining if voltage provided to a load is over an overvoltage threshold and providing an overvoltage indicator based on results of the determination;
a deglitch circuit for providing a smoothed overvoltage indicator by removing transient indications from the overvoltage indicator that the voltage provided to the load is over the overvoltage threshold; and
a controller configured to operate the high side switch, the low side switch, and the bypass switch of each phase based on the smoothed overvoltage indicator;
wherein the at least one phase comprises a plurality of phases coupled to the load in parallel;
wherein the controller is configured to open the high side switch and the low side switch and close the bypass switch for a first phase of the plurality of phases when the overvoltage indicator indicates that the voltage provided to the load is over the overvoltage threshold and to open the high side switch and the low side switch and close the bypass switch for at least some of others of the plurality of phases when the smoothed overvoltage indicator indicates that the voltage provided to the load is over the overvoltage threshold; and
wherein the controller is further configured to maintain the at least some of others of the plurality of phases with the high side switch and the low side switch open and the bypass switch closed for a plurality of cycles after the overvoltage indicator no longer indicates that the voltage provided to the load is over the overvoltage threshold.

2. A voltage regulator, comprising:
at least one phase of a voltage regulator, each phase comprising a high side switch and a low side switch coupled in series between a higher voltage and a lower voltage, with an output inductor having a first end coupled to a node between the high side switch and the low side switch and a second end coupled to a load, with a bypass switch in parallel to the inductor;
an overvoltage comparator for determining if voltage provided to a load is over an overvoltage threshold and providing an overvoltage indicator based on results of the determination;
a deglitch circuit for providing a smoothed overvoltage indicator by removing transient indications from the overvoltage indicator that the voltage provided to the load is over the overvoltage threshold; and
a controller configured to operate the high side switch, the low side switch, and the bypass switch of each phase based on the smoothed overvoltage indicator;
wherein the at least one phase comprises a plurality of phases coupled to the load in parallel; and
wherein the controller is configured to operate each of the phases in a normal mode and a bypass mode, the bypass mode being a mode for a phase in which the bypass switch is closed and the high side switch and the low side switch are open, and wherein the controller is configured to place a first phase of the plurality of phases in bypass mode when the overvoltage indicator indicates that the voltage provided to the load is over the overvoltage threshold, and wherein the controller is configured to place at least some other phases of the plurality of phases in bypass mode when the smoothed overvoltage indicator indicates that the voltage provided to the load is over the overvoltage threshold.

3. The voltage regulator of claim 2, wherein the controller is configured to exit operation of the first phase of the plurality of phases from bypass mode when the overvoltage indicator indicates that the voltage provided to the load is no longer over the overvoltage threshold, and to exit operation of the at least some of the other phases of the plurality of phases from bypass mode a programmable number of cycles after the smoothed overvoltage indicator no longer indicates that the voltage provided to the load is over the overvoltage threshold.

4. A voltage regulator, comprising:
   at least one phase of a voltage regulator, each phase comprising a high side switch and a low side switch coupled in series between a higher voltage and a lower voltage, with an output inductor having a first end coupled to a node between the high side switch and the low side switch and a second end coupled to a load, with a bypass switch in parallel to the inductor;
   an overvoltage comparator for determining if voltage provided to a load is over an overvoltage threshold and providing an overvoltage indicator based on results of the determination;
   a deglitch circuit for providing a smoothed overvoltage indicator by removing transient indications from the overvoltage indicator that the voltage provided to the load is over the overvoltage threshold; and
   a controller configured to operate the high side switch, the low side switch, and the bypass switch of each phase based on the smoothed overvoltage indicator;
   wherein the deglitch circuit comprises a plurality of latches arranged in a sequence and a plurality of AND gates arranged in a sequence, with each AND gate receiving, as an input, an output of a corresponding one of the latches, and a multiplexer receiving, as inputs, outputs of the AND gates.

5. The voltage regulator of claim 4, wherein the controller is configured to open the high side switch and the low side switch and close the bypass switch for at least one phase when the smoothed overvoltage indicator indicates that the voltage provided to the load is over the overvoltage threshold.

6. The voltage regulator of claim 5, wherein the at least one phase consists of one phase.

7. The voltage regulator of claim 4, wherein the at least one phase comprises a plurality of phases coupled to the load in parallel.

* * * * *